No. 623,427. Patented Apr. 18, 1899.
H. P. RICHARDS & B. F. SNYDER.
THILL COUPLING.
(Application filed Feb. 9, 1899.)
(No Model.)
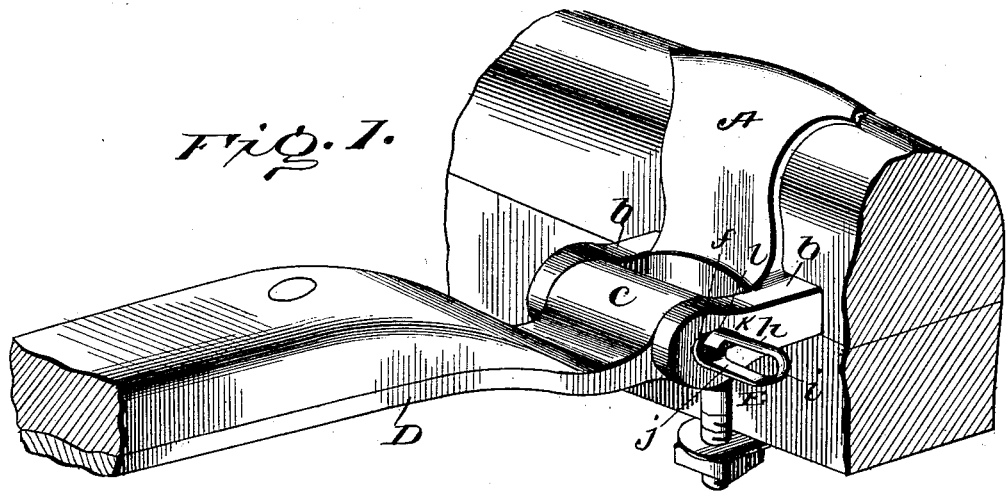
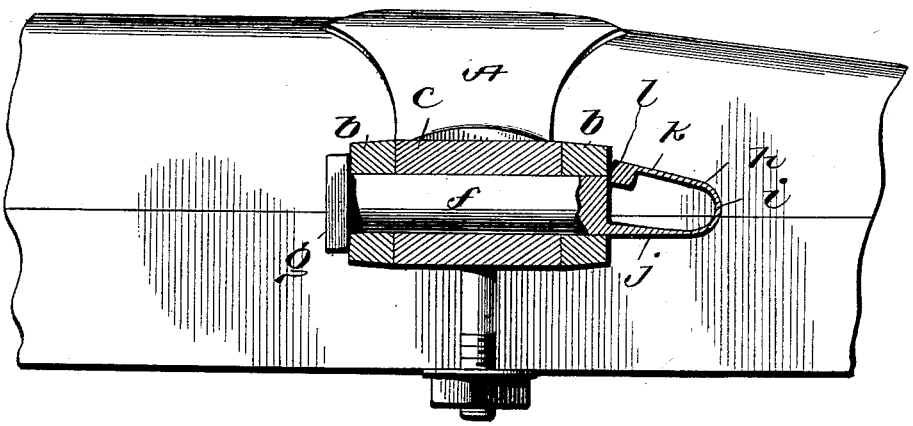
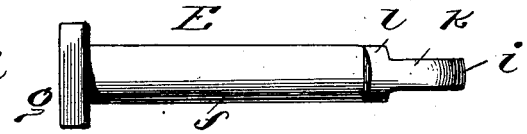
Inventors:
H. P. Richards
B. F. Snyder

UNITED STATES PATENT OFFICE.

HORACE P. RICHARDS AND BENJAMIN F. SNYDER, OF BALD MOUNT, PENNSYLVANIA, ASSIGNORS OF ONE-THIRD TO M. M. HUFFORD, OF CLARK'S SUMMIT, PENNSYLVANIA.

THILL-COUPLING.

SPECIFICATION forming part of Letters Patent No. 623,427, dated April 18, 1899.

Application filed February 9, 1899. Serial No. 705,105. (No model.)

*To all whom it may concern:*

Be it known that we, HORACE P. RICHARDS and BENJAMIN F. SNYDER, citizens of the United States, residing at Bald Mount, in the county of Lackawanna and State of Pennsylvania, have invented certain new and useful Improvements in Thill and other Like Couplings; and we do hereby declare the following to be a full, clear, and exact description of the invention, such as will enable others skilled in the art to which it appertains to make and use the same.

This invention relates to improvements in thill and other like couplings wherein the nature of the parts is such as to relieve the securing-bolt of undue longitudinal or endwise strain, and the object thereof is to provide a bolt for connecting the parts of couplings of this character which dispenses with the employment of a nut and embodies an improved locking device adapted to hold it securely against casual displacement and facilitate its insertion and removal.

To this end the invention consists of certain novel features of construction, combination, and arrangement of parts, which will be hereinafter more fully described, and particularly pointed out in the appended claims.

Reference is to be had to the accompanying drawings, forming a part of this specification, in which—

Figure 1 is a perspective view of a thill-coupling embodying our invention. Fig. 2 is a cross-sectional view thereof. Figs. 3 and 4 are detail views of the bolt on an enlarged scale.

Referring now more particularly to the drawings, wherein like letters of reference designate corresponding parts throughout the several views, A represents the axle-clip of a thill-coupling of ordinary construction, which is provided, as usual, with the ears $b$, having alined openings for passage of the securing-bolt and forming a yoke for the reception of the eye $c$ on the rear end of the thill-iron D. Our invention is particularly intended for use in connection with this and similar couplings wherein the lateral movement of one part is limited by the member or members of the other part and the bolt thereby relieved of undue longitudinal or endwise strain, although it is not limited to couplings in which the yoke is formed upon the stationary part, as the position of the parts may be reversed without affecting the practical utility of the invention.

The eye of the thill-iron is pivotally connected to the clip in the usual manner by the bolt E, which is passed through the same and openings in the ears of the clip, and this bolt is constructed, in accordance with our invention, of spring-steel to render it of maximum strength and durability and provide for the necessary spring action of the locking tongue or detent. The shank $f$ of the bolt is smooth-surfaced or threadless throughout its entire length and is made of such length that the ends thereof will when the bolt is inserted to connect the parts of the coupling terminate flush or substantially flush with the outer faces of the ears of the clip, as clearly shown in Fig. 2. Upon one end of the shank is formed a head $g$ of any preferred size and form and which is adapted to bear against the outer face of one of the ears of the clip to hold the bolt against movement in one direction in the ordinary manner. Upon the opposite end of the shank is formed an outwardly-projecting locking tongue or detent $h$, which consists of a thin strip or plate of reduced width with respect to the cross-sectional area of the shank. This strip is U-shaped or bent approximately into the form of a loop, the open end of which faces the contiguous end of the shank, while the curved central portion $i$ thereof forms the closed outer end of the loop. The inner end of one of the side arms $j$ of this loop-shaped locking tongue or detent is formed integrally with the end of the bolt adjacent to or in line with one side thereof and is preferably thickened to provide a beveled reinforcing portion, which strengthens the loop and reduces liability of breakage of the same at its point of connection with the shank to the minimum. The opposite side arm $k$ of the tongue or detent is free or unconfined and forms by reason of the elasticity of the strip a yielding tongue which normally stands out from the shank of the bolt at the side diametrically opposite the fixed arm. The free end of this yielding tongue carries a head or lug $m$, which is adapted to bear against the outer face of the adjacent ear of the clip and prevent accidental retraction of the bolt and extends transversely of the tongue to form a broad finger or thumb piece by which the tongue may be readily pressed inwardly to release the bolt.

The locking device at the end of the bolt, concisely stated, is a strip in line with a side thereof and having its end portion recurved or folded upon itself, forming the arm $k$, whose terminal projects beyond the opposite side of the bolt and prevents the withdrawal of the latter when positioned in the manner herein set forth. The arms or members $k$ and $j$ come upon diametrically opposite sides of the bolt, and the arm $j$ is flush at its outer side therewith.

In inserting the bolt the eye of the thill-iron is held in alinement with the openings in the ears of the clip and the tongue end of the bolt passed therethrough to connect said parts, the free end of the tongue yielding under pressure when coming in contact with the walls of the openings to permit of the bolt being readily slipped through. When it is desired to withdraw the bolt, the tongue is forced back under pressure of the tongue or finger on the lug until it is brought into registry with the openings, whereupon it may be easily retracted to release the thill-iron.

From the foregoing description, taken in connection with the accompanying drawings, it will be readily seen that our invention provides a bolt which dispenses with the use of nuts and other objectionable fastenings which are liable to work loose and drop off or, on the other hand, to wedge or bind so tight as to require the use of wrenches or other tools applied to both the head of the bolt and the nut and the expenditure of much time and labor in releasing the same. The extremely simple and easy manner in which our bolt can be inserted and removed will be readily appreciated, and it will further be seen that the form of locking-tongue employed provides a safety attachment which will securely hold the bolt against casual retraction and cannot become broken or otherwise injured by movement of the parts of the coupling on the bolt, inasmuch as in the class of couplings referred to the bolt is relieved of undue longitudinal or endwise strain and no pressure falls on the tongue.

Having thus described the invention, what is claimed as new is—

1. A bolt provided with a terminal locking device, the same consisting of an integral strip in line with a side of the bolt and folded or doubled upon itself, the recurved portion appearing at the diametrically opposite side of the bolt and normally projecting beyond the side thereof, substantially as and for the purpose described.

2. A bolt for thill and like couplings, comprising a shank provided with a head at one end and an integral locking device at its other end, said device consisting of a loop-shaped reduced strip or plate extending across the shank and having a fixed portion forming an extension thereof and an opposite free portion forming a tongue having at its inner end an abutting lug which normally projects beyond the said shank.

3. A bolt for thill and other like couplings having a threadless shank provided at one end with a head and at the other end with a substantially U-shaped locking device, consisting of a strip or plate one end of which is formed integrally with the shank adjacent to or in line with one side thereof, and the other end left free to form a tongue which normally stands out from the diametrically opposite side of the shank and is provided with a transverse head or lug, substantially as described.

In testimony whereof we affix our signatures in presence of two witnesses.

HORACE P. RICHARDS.
    BENJAMIN F. SNYDER.

Witnesses:
 MILTON M. HUFFORD,
 ARTHUR K. STEARNS.